United States Patent Office 3,644,476
Patented Feb. 22, 1972

3,644,476
PREPARATION OF ADIPONITRILE
Olav T. Onsager, Waldwick, N.J., assignor to Halcon International, Inc.
No Drawing. Continuation-in-part of applications Ser. No. 801,757 and 801,758, both Feb. 24, 1969. This application June 23, 1969, Ser. No. 835,722
Int. Cl. C07c 121/26
U.S. Cl. 260—465.8
5 Claims

ABSTRACT OF THE DISCLOSURE

A process for the reductive coupling of a compound having the formula

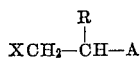

wherein X is Cl, Br, or I, R is H or lower alkyl, and A is —CN,

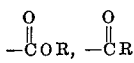

or —CONR$_2$, using as reducing agent zero valent iron or nickel or compounds thereof. The invention especially relates to an overall process for the production of linear dimers of compounds of the formula

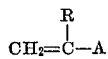

by first hydrohalogenation to

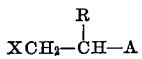

followed by the reductive coupling.

BACKGROUND OF THE INVENTION

This invention relates to a process for the reductive coupling of particular halo organic compounds and in particular provides a process for the preparation of valuable compounds such as adiponitrile starting with inexpensive and readily available compounds such as acrylonitrile.

Adiponitrile is a chemical of very great potential importance since it is easily converted to hexamethylene diamine by straightforward procedures. Hexamethylene diamine is, of course, a component of nylon 6,6.

Presently, the bulk of hexamethylene diamine is prepared by the costly route of first preparing adipic acid and subsequently converting the adipic acid to hexamethylene diamine. In view of the high expenses associated with the adipic acid route, those skilled in this art have devoted much time and energy to devising other, less costly routes.

Acrylonitrile has become a cheap and readily available chemical and great efforts have been expended in order to successfully prepare adiponitrile from acrylonitrile, via linear dimerization of hydrodimerization procedures. However, such methods have not proved completely successful since in linear dimerizations yields are very low and high amounts both of polymer and of the branched dimer tend also to be produced. In U.S. Pat. 3,225,083, for example, linear dimerizations are taught using aromatic tertiary phosphine catalysts but these produce at best only minor amounts of linear dimer. Hydrodimerizations produce better yields of adiponitrile but inevitably high amounts of propionitrile are also produced thus rendering the process as economically unattractive. For example, British Pat. 1,079,696 shows hydrodimerization using a ruthenium catalyst with yields of linear products less than 50% based on consumed acrylonitrile.

Hydrodimerizations have also been taught using alkali metal amalgams but low yields and great inefficiencies have been major disadvantages. U.S. Pat. 3,215,726 seeks to provide an improvement by using beta-halopropionitrile in combination with acrylonitrile in the alkali metal amalgam system but still shows high production of propionitrile and poor yields of adiponitrile despite the use of expensive procedures and reagents. Electrolytic hydrodimerization procedures suffer from the problems inherent in electrolytic cell usage-proportional capital cost for increase capacity insofar as the electrolytic cells are concerned, and high power costs.

The extension of carbon chains by the reductive coupling of two groups is well known in the art. Organic coupling has been accomplished for example by the well known Wurtz reaction wherein an organic halide is coupled in the presence of metallic sodium. Similarly, organic halo compounds activated by groups such allylic, benzylic, gem di-halides and 1,2 dihalides have been coupled.

For example, in British Pat. 858,514 the coupling of chloro substituted allylic cyano compounds is shown. However, the coupling of non-activated halo-compounds is not shown.

RELATED APPLICATIONS

The present application is a continuation-in-part of copending applications, Ser. No. 801,757 filed Feb. 24, 1969 and Ser. No. 801,758 filed Feb. 24, 1969.

SUMMARY OF THE INVENTION

In accordance with the present invention, an organic compound having the formula:

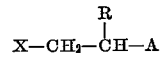

is coupled by reaction in the liquid phase at about 50°–250° C. with nickel or iron or zero valent compounds thereof to produce the coupled product.

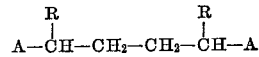

A being —CN,

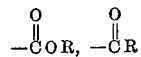

or —CONR$_2$, R being hydrogen or lower alkyl (1 to 4 carbon atoms), and X being chloro, bromo, or iodo. In by far the most preferred embodiment, adiponitrile is prepared by the coupling of 3-halopropionitrile, especially 3-bromopropionitrile.

In a particular practice, the above coupled product is prepared from the unsaturated compound

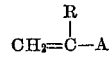

by the steps of reacting said unsaturated compound with HX to produce

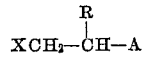

followed by the coupling of this latter product. The compounds

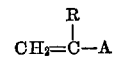

wherein R and A are as above indicated undergo anti-Markownikoff addition of HX and this is essential in order to produce the halo-organic product which is coupled to form the saturated linear derivative of the above said unsaturated material.

Although the invention has wide applicability, in an especially advantageous practice there is provided a procedure for producing adiponitrile i.e., $$N\equiv C-CH_2-CH_2-CH_2-CH_2-C\equiv N$$

from 3-halo propionitrile. It will, of course, be understood that the adiponitrile is readily converted to hexamethylene diamine by known techniques.

DETAILS OF THE INVENTION (A) The halo organic compound

The halo organic compound has the formula $$X-CH_2-\underset{\underset{R}{|}}{C}H-A$$

wherein X is chloro, bromo, or iodo, R is hydrogen or $C_1-C_4$ alkyl, and A is —CN, $$-\overset{\overset{O}{\|}}{C}OR, \;-\overset{\overset{O}{\|}}{C}R$$

—$CONR_2$. Examples are 3-bromopropionitrile,
3-chloropropionitrile,
3-iodopropionitrile,
3-bromo-2-methyl propionitrile,
3-chloro-2-methyl propionitrile,
3-iodo-2-methyl propionitrile,
3-bromopropionic acid,
3-chloro-propionic acid,
3-iodo-propionic acid,
3-bromo methyl propionate,
3-chloro methyl propionate,
3-iodo methyl propionate,
3-bromo propionamide,
3-chloro propionamide,
3-iodo propionamide,
methyl (2-bromoethyl) ketone,
methyl (2-iodoethyl) ketone,
methyl (2-chloroethyl) ketone.

(B) Preparation of the halo organic compound

The halo-organic compounds which are coupled in accordance with the present invention, are most suitably prepared by hydrogen halide addition to the unsaturated precursor, i.e., $$CH_2=\underset{\underset{R}{|}}{C}-A + HX \longrightarrow XCH_2-\underset{\underset{R}{|}}{C}H-A$$

wherein X, R and A are as above described. Of course, other methods are possible and could be used in carrying out the present invention.

The hydrogen halide addition is advantageously carried out by passing hydrogen halide into contact with liquid unsaturated precursor at moderate conditions, i.e., at 10–100° C. for example. The hydrogen halide may be liquid or vapor.

All vapor phase techniques can be employed but these are not preferred.

Catalysts such as described in U.S. Pat. 2,524,020, for example, can be employed.

Preferably, the gaseous hydrogen halide is passed into the liquid unsaturated compound until the addition reaction substantially ceases, e.g., 5 minutes to 10 hours, and thereafter the product beta halocompound $$X-CH_2-\underset{\underset{R}{|}}{C}H-A$$

is recovered by straightforward distillation.

(C) The reducing agent

The reductive coupling of the present invention is carried out in the presence of iron or nickel metal and/or in the presence of a zero valent iron or nickel compound.

Insofar as the coupling agent is concerned, by far the most preferred practice of the invention involves the use of metallic iron as the coupling agent. Still further, it is preferred but not essential that the iron be added in finely divided form, for example, as iron powder. Iron in bulk form e.g., as sheets or large particles has also been found effective in the process of the invention. The iron can be formed in situ as by decomposition of a precursor compound.

Metallic nickel which is the least preferred coupling agent in the inventive process, can be employed in finely divided form as for example powder, or it may be provided in bulk form.

The coupling agent can also be composed of a zero valent nickel or iron moiety and a ligand or a nickel or iron carbonyl moiety and a ligand as set forth in co-pending application Ser. No. 801,757 filed Feb. 24, 1969 of which this application is a continuation in part.

The ligand moiety of the coupling agent may be any Lewis base such as phosphines, phosphites, phosphorous halides, amines, pyridines, o-phenanthrolines, arsines and stibines.

The phosphines, arsines, stibines and phosphites may be suitably represented by the following general formulae:

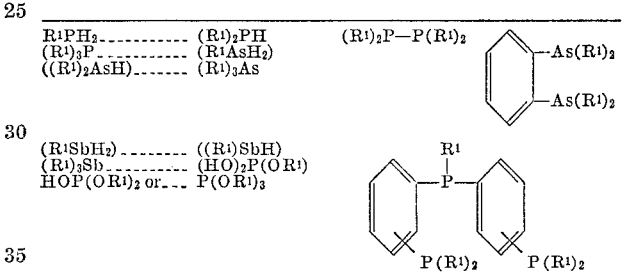

The various $R^1$ groups may be the same or different in each ligand and may be an aliphatic, aromatic, ar-alkyl, alicyclic, phenoxy or phenylene group, both substituted and unsubstituted. The aliphatic group may be an alkyl from 1–12 carbon atoms such as methyl, ethyl, butyl, heptyl, decyl and the like and may be substituted with a group such as lower alkoxy, (methoxy, propoxy) hydroxy and cyano. Preferably, the aliphatic group is a lower alkyl group containing from 1–5 carbon atoms such as methyl, ethyl, butyl and the like. The aromatic group may be phenyl or a substituted phenyl such as methoxyphenyl, hydroxyphenyl, cyanophenyl and the like. The aralkyl group may be a benzyl, phenethyl, phenylpropyl and the like or substituted aralkyl groups containing the substituents as indicated above. The alicyclic group may be a cycloalkyl or from 3–6 carbons, such as cyclopropyl, cyclohexyl and the like or a substituted alicyclic such as with a lower alkyl, a lower alkoxy and the like. The phenoxy or phenylene group may be conveniently substituted with a cyano, hydroxy, lower alkoxy and the like.

The phosphorous halide reducing agent ligands may be shown by the following formulae:

$$P(R^1)_2X^1 \quad PR^1X^1_2 \quad PX^1_3$$

wherein $X^1$ may be bromine, chloride or fluorine. The $R^1$ group may be a phenyl lower alkyl group of from 1–6 carbon atoms or a cycloalkyl of from 3 to 12 carbon atoms on the ring. Representative examples of such phosphorous halides are as follows:

$PCl_3 \quad PBr_3 \quad PF_3$
$P(phenyl)_2Cl$
$P(ethyl)Cl_2$
$P(cyclohexyl)_2Cl$ The amine ligands may be primary, secondary or tertiary amines of the general formula $R_1NH_2(R_1)_2NH$, $(R_1)_3N$ wherein $R_1$ has the same definition as the $R^1$ group for the phosphines etc., shown on page 6 and especially lower alkyl of from 3 to 6 carbons such as propyl, pentyl and the like. The aliphatic substituents of both the secondary and tertiary amines may be the same or different. Representative examples of the various amines are diethylamine, triethylamine, dipropylamine, isopropylamine, n-butylamine, tributylamine, diamylamine, 2-methyl-4-hexylamine, 2-ethylhexylamine, 1,1,3,3-tetramethylbutylamine and the like. The amines may also be alicyclic amines containing from 3 to 6 carbon atoms in the ring such as cyclopropylamine (cyclohexylmethyl) amine and the like. The amines may also be aromatic amines such as aniline and p-phenylene diamine.

The ligands may also be heterocyclic amines such as pyridine and o, m, or p-phenanthroline.

In the more preferred aspect of this practice of the invention the ligand moiety of the reducing agent contains a tri-valent phosphorous and an alkyl of from 1 to 8 carbon atoms, a substituted alkyl (from 1 to 8 carbons) a non-substituted cycloalkyl of from 3 to 6 carbon atoms, phenyl, a lower alkylidene (1 to 3 carbons), a mono di or tri lower alkyl, phenoxy, phenyl or phenylene and combinations of all of the above. Representative examples of the more preferred ligands of my invention, therefore, are: $P(ethyl)_3$, $P(n\text{-}octyl)_3$, $P(ethylcyano)_3$, $P(cyclohexyl)_3$, $P(phenyl)_3$, $P(phenyl)_2$ Cl, $P\text{-}[N\text{-}(butyl)_2]_3$, $P(O\text{-}phenyl)_3$, $P(t\text{-}butyl)_3$, $(phenyl)_2 P\text{-}(CH_2)_2\text{-}P(phenyl)_2$ and $(phenyl)_2 P\text{-}(o\text{-}phenylene)\text{-}P(phenyl)_2$, $PCl_3$, Sb $(n\text{-}butyl)_3$ or $AS(phenyl)_3$.

The preferred reducing agents are those containing carbonyl. Representative examples of the reducing agents of this embodiment of the invention are as follows:

$[P(phenyl)_3] Ni (CO)_3$, $[P(n\text{-}butyl)_3]_2 Ni (CO)_2$
$[P(ethylcyano)_3]_2 Ni (CO)_2$, $[P(ethylcyano)_3]_3 Ni(CO)$
$[P(N\text{-}ethyl)_2)_3]_2 Ni (CO)_2$, $[PCl_3]_4 Ni$, $[PF_3]_4 Ni$,
$[(phenyl)_2 P\text{-}(CH_2)_2 \text{-}P (phenyl)_2] Ni (CO)_2$,
$[P(phenyl)_3]_2 Ni (acrylonitrile)_2$, $[P(n\text{-}butyl)_3]_2 Ni (duroquinone)$
$[Ni (o\text{-}phenanthroline)_3]$ $[Ni_2 (CO)_6]$, $[Sb(n\text{-}butyl)_3]_2 Ni (CO)_2$
$[As(phenyl)_3]_2 Ni (CO)_2$, $[P(cyclohexyl)_3]_2 Fe (CO)_3$,
$[P(phenyl)_3]\text{-}Fe(CO)_4$, and
$[P(phenyl)_3]_2 Fe (CO)_3$.

The coupling agent can also be a metal olefin complex of nickel or iron formed in situ or performed as set forth in copending application Ser. No. 801,758 filed Feb. 24, 1969 of which this application is a continuation in part.

In this embodiment of the invention, the coupling agent is a metal olefin complex represented by the formula

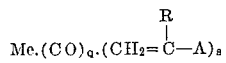

wherein Me is Fe or Ni, $q$ is an integer from zero to four, $s$ is an integer from one to three, and R and A are as above described.

Representative examples of the metal olefin complex coupling agents of this embodiment are:

Ni $(acrylonitrile)_2$, Ni $(methacrylonitrile)_2$
Ni $(acrolein)_2$, Ni $(acrylic acid)_2$,
Ni $(acrylic acid ethyl ester)_2$,
Fe $(acrylonitrile) (CO)_4$, Fe $(methacrylonitrile) (CO)_4$,
Fe(acrolein) $(CO)_4$ and Fe $(acrylic acid) (CO)_4$.

The metal olefin complex,

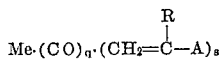

can be suitably prepared by methods well known in the art for the reaction of a metal carbonyl with an olefin. For example, the metal carbonyl is refluxed with the appropriate olefin compound, until the desired reaction is substantially complete. Alternatively, the complex can be prepared in situ introducing the metal carbonyl and olefin into the coupling reaction zone to which is also added the halo organic compound.

(D) The coupling reaction

The various practices of the invention can be described by the following overall equations:

(a) Metallic iron or nickel coupling agents (1)
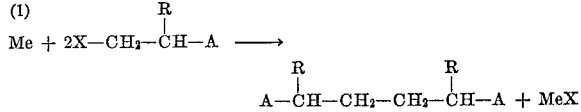

(b) Lewis base containing complex coupling agents (2)
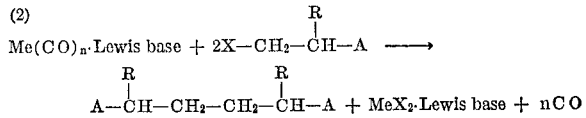

where $n$ is 0–5

(c) Preformed metal olefin complex coupling agents (3)
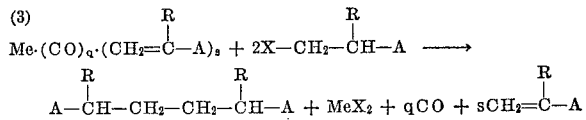

Preferably the reactions set forth in Equations 1, 2 and 3 are carried out in the presence of an olefinically unsaturated compound,

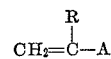

whereby enhanced yields and selectivities are achieved. It should be noted that this olefinic compound preferably but not necessarily is the precursor of the halo-organic compound which is coupled.

(d) In situ formed metal olefin complex coupling agents (4)
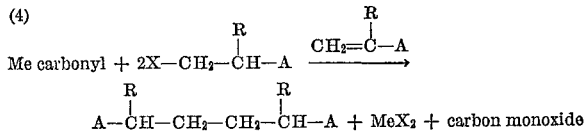

In each of the above, Me, X, R, A, $q$ and $s$ are as above defined.

All of the starting materials, i.e., the Ni, Fe, Lewis base, olefinic compound, halo-organic compound, HX, and the like may be employed as obtained from commercial sources, that is containing impurities normally associated with these materials.

The preparation of coupled product in accordance with reaction (4) described above proceeds via an in situ formation of the metal olefin complex. The formation of coupled product by this reaction is quite surprising when one considers that the art teaches that non-activated halogen compounds (i.e., non-allylic, non-benzylic, etc.) do not undergo reductive dimerizations with metal carbonyls and that in the reaction of an olefin with a metal carbonyl, a metal olefin complex is formed. For example, nickel carbonyl and pure 3-bromopropionitrile does not undergo a reductive dimerization and nickel carbonyl with acrylonitrile does not yield a dimer but rather bis acrylonitrile nickel. However, 3-bromopropionitrile does undergo a reductive dimerization to adiponitrile, with nickel carbonyl in the presence of acrylonitrile.

In each of the above shown overall equations to coupled product it is believed that an intermediate novel compound is formed which rearranges in the final reaction step to form the products above shown. This intermediate compound can be represented by the formula

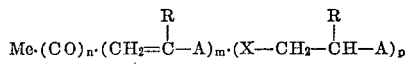

wherein $n$ and $m$ are integers of 0 to 5, $p$ is an integer of 1 to 6, the sum of $n$, $m$, and $p$ being greater than 1 and less than 7. These compounds are believed novel and are described and claimed in copending application Ser. No. 801,757 filed Feb. 24, 1969. Me, R, A and X are as above defined herein.

The coupling agent is incorporated in the reaction system in sufficient amount to provide for the desired reductive coupling. By reductive coupling as used in the present specification and claims is meant a coupling of two molecules of the halo organic compound by the displacement of the halogens and the attachment of the carbons which contained these halogens to one another. Where a single halo organic compound is employed, the coupled product will represent a reduced dimer of the precursor of the halo organic compound. Where a mixture of different halo organic compounds is employed the coupled product will represent a mixture of dimers of the precursors of each of the halo compounds as well as co-dimers.

(E) Coupling reaction condition

The reductive coupling is carried out in liquid phase with the total system pressure being sufficient to maintain the liquid phase, e.g., 0.1 to about 4000 atmospheres, preferably 1 to about 100 atmospheres. Preferably an inert atmosphere is employed, e.g., $N_2$, argon, $CO_2$, helium or the like. With carbonyl compound catalysts, however, a CO atmosphere is preferred.

The reaction temperature can range from 50 to 250° C. desirably from 80° C. to 200° C. and preferably from 100 to 175° C. The reaction time is sufficient to achieve the desired conversion and suitable reaction times range from 1 minute to about 50 hours, desirably 30 minutes to 40 hours, and preferably 2 to 20 hours.

In an especially preferred practice of the invention, the precursor which, upon addition of hydrogen halide, forms the functionally substituted halo organic compound is incorporated in the reaction system.

For example, in the case of 3-halopropionitrile, it is advantageous to incorporate acrylonitrile in the reaction system to reduce propionitrile make.

Solvents can be employed with materials which are formed during the reaction being preferred. For example, adiponitrile or propionitrile are preferred solvents in the coupling of 3-halopropionitrile. Other solvents can, however, be employed as illustrated by benzene, acetonitrile, acetic acid, ethyl acetate, chlorobenzene, benzonitrile, heptane, dimethyl formamide, dioxane, cyclohexane, tetrahydrofuran, triethylene glycol, and the like.

Suitable mixtures for accomplishing the reductive coupling may have the following illustrative composition by weight on a coupling agent free basis:

|  | Broad, percent | Desired, percent | Preferred, percent |
|---|---|---|---|
| Halo organic compound | 10–100 | 20–99 | 50–98 |
| Halo organic compound precursor | 0–90 | 1.0–80 | 2–50 |
| Solvent | 0–90 | 0–40 | 0–10 |

Where the unsaturated precusor of the halo organic compound is employed in the reaction mixture, it is frequently advantageous to employ polymerization inhibitors in order to prevent polymer formation. These inhibitors do not interfere with the coupling reactions and do effectively suppress the formation of polymer. Illustratively, the inhibitors are used in amounts ranging from about 0.01 to 10% by weight based on said unsaturated precursor. Specific examples of inhibitors include hydroquinone, methylene blue, p-nitrosodimethyl aniline, methoxyphenol, di-t-butyl para cresol, and the like.

(F) Product mixture separation

The coupling reaction can be carried out in accordance with continuous or batch procedures.

In batch procedures, the reagents are charged to the reaction zone and the reagent mixture is heated to reaction temperature for the desired reaction time.

In continuous procedures one or a series of zones can be employed maintained at essentially steady state reaction conditions. Reagents are continuously added and reaction mixture continuously withdrawn.

In each of the above procedures, the reaction mixture contains the coupled product, i.e.,

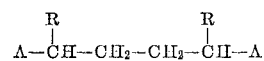

the coupling agent in the form of the halide, i.e., $FeX_2$ or $NiX_2$, and may contain solvent, unreacted halocompound and/or coupling agent, the unsaturated halocompound precursor, as well as a small amount of by-product.

In one suitable operation, the reaction mixture is resolved by fractional distillation. The organic components are separated one from the other by fractional distillation in one or a series of columns. Since the reaction mixture contains the coupling agent in the form of the halide and may contain some polymer scraped surface vacuum apparatus are appropriate for separate volatiles from solids in the reaction mixture. The solids can be discarded or can be worked by known procedures for the recovery of coupling agent and halide values.

In another suitable operation, the reaction mixture can be resolved by extraction and distillation procedures. For example, the reaction mixture can be contacted with water and the resulting mixture phase separated into an organic phase containing the bulk of the organic constituents and an aqueous phase containing the $FeX_2$ or $NiX_2$. The aqueous phase will contain some organics and these can be recovered by stripping and/or extraction as with benzene or the like solvent. The $FeX_2$ or $NiX_2$ can be discarded or recovered and converted to HX and coupling agent by known procedures. The organics are readily resolved by fractional distillation.

Other techniques will be apparent and can be employed.

Adiponitrile production

The present invention is especially useful for the production of adiponitrile and exceedingly high reaction selectivities and yields can be achieved.

In this embodiment of the invention the halo organic compound is 3-bromopropionitrile, 3-chloropropionitrile or 3-iodopropionitrile, or mixtures. The bromo compound is preferred. As to the coupling agent, metallic iron in finely divided form is preferred.

In a first step, hydrogen halide is passed into liquid acrylonitrile until hydrogen halide absorption substantially ceases. The resulting 3-halopropionitrile is employed in the coupling reactions described below.

In one practice, the 3-halopropionitrile and coupling agent are charged to the reactor, heated to the suitable reaction temperature, and maintained at reaction temperature until completion of the reaction whereupon the mixture is separated by distillation and/or extraction procedures to recover product. In this technique acrylonitrile is advantageously added with the 3-halopropionitrile to enhance the selectivity to the desired adiponitrile. The coupling agent in halide compound form may be recovered and discarded or converted to its original form for reuse.

In an alternative practice, the process is carried out in accordance with continuous procedures. A reactor is charged with 3-halopropionitrile, acrylonitrile and coupling agent and heated to reaction temperature. Acrylonitrile, and 3-halopropionitrile and coupling agent are added continuously and liquid reaction mixture is continuously removed. The liquid reaction mixture is separated by distillation and/or extraction with recycle or halopropionitrile, and acrylonitrile, recovery of product adiponitrile, and discard or recovery, regeneration and recycle of coupling agent.

Other procedures will be apparent to those skilled in the art and such alternatives can be used. For example, the halo organic compound which is coupled need not be added as such but can be formed in situ as by the reaction of hydrogen halide and appropriate precursor.

In the following examples, which are intended to illustrate the invention, unless otherwise indicated parts indicate parts by weight.

EXAMPLE 1

Preparation of adiponitrile from acrylonitrile

Acrylonitrile (2,800 gms.) is charged to a 5 liter 3 necked flask equipped with a stirrer, condenser and a gas inlet tube. Anhydrous hdyrogen bromide is fed into the acrylonitrile, with external cooling, at a fast enough rate so as to maintain a temperature of 15° to 25° C. Hydrogen bromide absorption ceases after about 3 hours. The solution is then distilled through a 20 plate 1" Oldershaw column at a reflux ratio of 3/1, 10 mm. Hg. The product cut distills at 75–76° C., and 3-bromopropionitrile product is recovered in 96% yield.

A portion of the resultant 3-bromopropionitrile (325 grams) is charged with 40 grams of iron powder into a 500 cc. glass vessel equipped with an agitator and reflux condenser. The mixture is heated and the reaction is carried out under a blanket of nitrogen for 6 hours at 150° C. After cooling to room temperature 200 cc. distilled water is added and the mixture is agitated for ½ hour. The dark brown mixture is filtered to recover unreacted iron which is washed with 3-bromopropionitrile and water. The filtrate and the washings are combined and the resulting mixture is separated into aqueous and organic phases. The organic phase contains 37.8 grams adiponitrile and 4.3 grams propionitrile while the water phase contains 2.3 grams adiponitrile and 0.9 gram propionitrile.

All of the soluble iron is in the water layer. The conversion of iron is 75% and the adiponitrile selectivity based on iron is 63 mol percent.

The organic phase is distilled through a Vigreau column (½" x 16") at 200 mm. Hg and at a reflux ratio of 5/1 to remove propionitrile and acrylonitrile, then at 10 mm. Hg to recover 3-bromopropionitrile (head temperature of 75° C.) and finally at 2 mm. Hg to recover adiponitrile (head temperature of 136–140° C.). The in hand yield of adiponitrile is 96% of the amount formed by analysis in the organic layer.

From carbon analysis of the distillation residue and byproduct analysis the 3-bromopropionitrile conversion is calculated to be 40% and the selectiivty to adiponitrile based on converted 3-bromopropionitrile is 74 mol percent.

EXAMPLE 1A

The procedure of Example 1 is repeated except that 17 grams of acrylonitrile are also charged to the coupling reaction.

The results thus obtained show a conversion of iron of 85% and selectivity to adiponitrile based on iron of 70 mol percent.

EXAMPLE 2

Preparation of adiponitrile from acrylonitrile

Acrylonitrile (2,800 grams) is charged to a 5 liter 3 necked flask equipped with a stirrer, condenser, and a gas inlet tube. Anhydrous hydrogen chloride is fed into the acrylonitrile, with external cooling, at a fast enough rate so as to maintain the temperature at 20° C. An approximately 90% conversion of acrylonitrile is obtained in about 4 hours. The solution is distilled at 200 mm. Hg in a 20 plate 1" Oldershaw column at a reflux ratio of 2/1, under nitrogen to remove unreacted acrylonitrile. The distillation is continued at 10 mm. Hg to recover 3-chloropropionitrile, at a head temperature of 65–68° C., in an 82% yield.

A portion of the resultant 3-chloropropionitrile (500 gm.) is charged with 50 gm. powdered iron to a one liter glass lined autoclave. After pressurizing the vessel with 250 p.s.i.g. nitrogen at room temperature the mixture is heated at 200° C. for 6 hours, cooled to room temperature and then agitated for ½ hour with an equal volume of water. The mixture is discharged and then filtered to recover unreacted iron. After washing the iron with 3-chloropropionitrile and water the washings are combined with the filtrate and the combined mixture (an emulsion) is extracted with ether. All of the soluble iron is found by analysis to be in the aqueous layer.

The organic layer is distilled at atmospheric pressure in a Vigreau column (½" x 16") and a reflux ratio of 3/1 to recover ether, at 200 mm. Hg to recover propionitrile and acrylonitrile, at 10 mm. Hg to recover 3-chloropropionitrile (head temperature 65–69° C.) and at 2 mm. Hg to recover adiponitrile (head temperature 136–139° C.).

From a carbon analysis of the residue, product and by-product analyses in both water and organic layers, it is shown that the adiponitrile selectivity is 68 mol percent based on a 26% conversion of 3-chloropropionitrile. The weight ratio of adiponitrile to propionitrile is about 5.

EXAMPLES 3–12

A series of coupling runs is made using the following general procedure:

The reactions are carried out in glass. Each glass reactor is charged with the designated materials and heated to the indicated reaction temperature where it is maintained for the specified time. Each mixture is then cooled and analyzed for the adiponitrile and propionitrile content which is a reliable measure of the reaction selectivity. It should be kept in mind that these examples are designed to demonstrate the effect of various reagents and reaction conditions and do not represent optimized operations from the yield or conversion viewpoint. The 3-bromopropionitrile and 3-chlropropionitrile used is prepared as described in Examples 1 and 2 respectively. The 3-iodopropionitrile of Example 4 is prepared by reacting 3-chloropropionitrile with sodium iodide in acetone under refluxing conditions and separated by fractional distillation.

TABLE I

| Run | 3-halo propionitrile Compound | 3-halo propionitrile Amount, parts | Coupling agent Compound | Coupling agent Amount, parts | Acrylonitrile, Amount, parts | Atmosphere | Pressure, p.s.i.a. Initial | Pressure, p.s.i.a. Final | Temp., °C. | Time, hrs. | Product mixture Adiponitrile, parts | Product mixture Propionitrile, parts |
|---|---|---|---|---|---|---|---|---|---|---|---|---|
| 3 | Bromo | 100 | Fe(CO)₅ | 20 | | Air | 15 | 15 | 150 | 9 | 3.3 | 0.6 |
| 4 | Iodo | 50 | Fe | 5 | | N₂ | 15 | 15 | 150 | 20 | 0.7 | 0.6 |
| 5 | Chloro | 100 | Ni | 10 | 20 | CO | 250 | 120 | 200 | 6 | 0.2 | 0.1 |
| 6 | Bromo | 100 | Ni | 10 | 13 | CO | 100 | 50 | 100 | 12 | 0.5 | 0.1 |
| 7 | do | 130 | Ni | 20 | 16 | CO | 250 | 180 | 150 | 4 | 2.6 | 0.1 |
| 8 | do | 600 | Ni(CO)₄ | 344 | 970 | CO | 100 | 100 | 125 | 6 | 47 | 4 |
| 9 | do | 80 | Ni | 10 | | CO | 250 | 240 | 140 | 17 | 1 | 0.1 |
| 10 | do | 400 | Fe | 50 | | Air | 15 | 15 | 150 | 6 | 51 | 5 |
| 11 | do | 400 | Fe | 56 | | do | 15 | 15 | 130 | 6 | 6 | 3 |
| 12 | do | 400 | Fe | 50 | 20 | do | 15 | 15 | 150 | 6 | 38 | 3 |

Note—(1) Run in steel autoclave with CO removal through refrigerated condenser.
(2) Charge also contained 40 parts ethanol.

In run 3 decomposition of the Fe(CO)$_5$ occurred in situ during the reaction with formation of finely divided iron metal.

EXAMPLE 13

Preparation of adipic acid diethyl ester from acrylic acid ethyl ester (a) Preparation of 3-bromopropanoic acid ethyl ester.—To a 500 ml. glass flask fitted with magnetic stirrer, thermometer, condenser and gas inlet tube is charged 150 grams of acrylic acid ethyl ester. Over a period of 2 hours one mol of dry hydrogen bromide gas is fed into the reaction mixture through the gas inlet tube. The mixture is stirred and cooled externally in an ice bath to maintain a reaction temperature of approximately 25° C. The effluent is then distilled at atmospheric pressure giving 50 grams of unreacted acrylic acid in the first cut up to a distillation temperature of 110° C. Continued distillation under reduced pressure at 44 mm. Hg gave a second cut between 110 and 115° C. (162 grams) which contains more than 95% by weight of the desired product, 3-bromopropanoic acid ethyl ester.

(b) Coupling of 3-bromopropanoic acid ethyl ester with iron.—150 grams of 3 bromopropanoic acid ethyl ester and 20 grams of degreased iron filings are charged to a 500 ml. glass reactor fitted with stirrer, temperature controller and condenser. The reaction mixture is then heated to 150° C. and the reaction temperature maintained at 150° C.±2° C. for 15 hours.

The reaction mixture is then cooled to room temperature, contacted with 150 ml. water and extracted twice with 200 ml. ether. The combined ether fractions are fractionally distilled and 22 grams of adipic acid diethyl ester are recovered in the cut boiling between 238 and 242° C. at atmospheric pressure.

EXAMPLE 14

Preparation of adipic acid from acrylic acid (a) Preparation of 3-bromopropanoic acid.—200 grams of acrylic acid are charged to a 500 ml. glass flask fitted with stirrer, thermometer, condenser and gas inlet tube. Over a period of 2 hours one mol of hydrogen bromide gas is fed into the reaction mixture through the gas inlet tube. The reaction mixture is stirred and cooled externally in an ice bath to maintain a reaction temperature of approximately 30° C.

Unreacted acrylic acid is then distilled off from the reaction mixture at 50° C./15 mm. Hg. The solid residue is washed with 100 ml. of cold n-heptane and then recrystallized from a mixture of n-heptane/benzene (3:1 by volume) to give 110 grams of desired product. The 3-bromopropanoic acid so obtained is dried in vacuum (10$^{-2}$ mm. Hg) at room temperature. The physical data of the product corresponds to those given in the literature for 3-bromopropanoic acid.

(b) Reaction of 3-bromopropanoic acid with iron.—76.5 grams of 3-bromopropanoic acid and 5.6 grams of degreased iron filings are charged in a 300 ml. glass reactor filter with stirrer, temperature controller, and condenser. The reaction mixture is then heated to 150° C. and the reaction temperature maintained at 150° C.±2° C. for 10 hours.

The reaction mixture is cooled to 40° C. and 200 ml. acetic acid added to give a homogeneous solution, after filtration of unreacted iron. Gas chromatographic analysis of the solution shows that 7.6 grams of adipic acid were formed.

EXAMPLE 15

Preparation of adiponitrile 5.0 grs. P[(phenyl)$_3$]$_2$ Ni (CO)$_2$ and 11.3 grs. 3-chloropropionitrile (substrate) are added to a 75 cc. stainless steel glass lined pressure vessel which has been evacuated to less than 1 mm. Hg and filled with nitrogen to atmospheric pressure. The reaction mixture is heated to 150° C. with agitation. After 1.5, 3.0 and 4.5 hrs. reaction time the reaction vessel is cooled to room temperature, connected to a gauge for pressure determination, vented, and a small sample drawn from the reaction mixture under nitrogen. The samples are analyzed by gas chromatography. The results are summarized in Table 2.

TABLE 2

| Reaction time, hrs. | Pressure, p.s.i.g. | Coupled product |
|---|---|---|
| 1.5 | 30 | 0.05 gram adiponitrile. |
| 3.0 | 40 | 0.10 gram adiponitrile. |
| 4.5 | 40 | 0.20 gram adiponitrile. |

In addition to adiponitrile, acrylonitrile and small amounts of propionitrile are also detected as reaction products. At the end of the reaction the adiponitrile is separated from the reaction mixture by fraction distillation. Similarly, when equivalent amounts of

[P(phenyl)$_3$] Ni (CO)$_3$, [P(n-butyl)$_3$]$_2$ Ni (CO)$_2$
[P(ethylcyano)$_3$]$_2$ Ni (CO$_2$), [P(ethylcyano)$_3$]$_3$ Ni (CO)
[P(N-ethyl)$_2$)$_3$]$_2$ Ni (CO)$_2$, [PCl$_3$]$_4$ Ni, [PF$_3$]$_4$ Ni,
[(phenyl)$_2$ P-(CH$_2$)$_2$ -P(phenyl)$_2$] Ni (CO)$_2$,
[P(phenyl)$_3$]$_2$ Ni (acrylonitrile)$_2$, [P(n-butyl)$_3$]$_2$ Ni (duroquinone)
[Ni (o-phenanthroline)$_3$] [Ni$_2$ (CO)$_6$], [Sb(n-butyl)$_3$]$_2$ Ni (CO)$_2$
[As(phenyl)$_3$]$_2$ Ni (CO)$_2$, are used in place of P[(phenyl)$_3$]$_2$ Ni (CO)$_2$ in the above example, similar results are obtained.

EXAMPLE 16

Preparation of adiponitrile 1.3 grs. [P(n-butyl)$_3$]$_2$ Ni (CO)$_2$, 16.3 grs. 3-bromopropionitrile and 8.8 grs. benzene are added to a 100 cc. glass flask fitted with condenser and magnetic stirrer and heated to reflux (temperature 80° C.) for 1 hour. During this time a dark violet solution containing 0.125 gr. of adiponitrile (determined by lvp. gas chromatography is obtained.

EXAMPLES 17–25

For examples 17–25 the experimental procedure of Example 15 is used. The results of these experiments are summarized in Table 3.

TABLE 3

| Ex. | Reducing agent | Grams | Substrate | Grams | Temp., °C. | Time, hrs. | Coupled prod. | Grams | By-products | Grams |
|---|---|---|---|---|---|---|---|---|---|---|
| 17 | [P(PH)$_3$]Ni(CO)$_3$ | 2.5 | 3-ClPrN | 11.3 | 150 | 9.0 | ADN | 0.05 | ACN, PrN | |
| 18 | Ni(CO)$_4$ | 1.5 | 3-ClPrN | 11.3 | 150 | 16.0 | No | | | |
| 19 | [P(Ph)$_3$]$_2$Ni(CO)$_2$ | 5.0 | 3-BrPrN | 32.6 | 140 | 16.0 | ADN | 0.450 | ACN, PrN | 0.800 |
| 20 | [P(Ph)$_3$]$_2$Ni(CO)$_3$ | 5.0 | 3-BrPrN / ACN | 32.6 / 1.6 | 140 | 16.0 | ADN | 0.515 | ACN, PrN | 0.160 |
| 21 | [P(ethyl-CN)$_3$]$_2$; Ni(CO)$_2$ | 3.0 | 3-BrPrN | 16.3 | 50 | 20.0 | ADN[1] | | | |
| 22 | [P(Bu)$_3$]$_2$Ni; ACN$_2$ | 2.0 | 3-BrPrN | 16.3 | 120 | 5.0 | ADN[1] | | | |
| 23[2] | [P(Ph)$_3$]Fe(CO)$_4$; [P(Ph)$_3$]$_2$Fe(CO)$_3$ | 2.0 | 3-ClPrN / ACN | 11.3 / 0.8 | 150 | 4.5 | ADN[1] | | | |
| 24 | [As(Ph)$_3$]$_2$Ni; (CO)$_2$ | 2.5 | 3-ClPrN | 11.3 | 150 | 8.0 | ADN[1] | | | |
| 25 | [2,2,bipyr]Ni; (CO)$_2$ | 2.5 | 3-BrPrN | 16.3 | 140 | 16.0 | ADN[1] | | | |

[1] Qualitatively detected by lvp. gas chromatography.
[2] A mixture of mono- and disubstituted iron carbonyl was prepared according to A. F. Clifford et al.—Inorg. Chem. 2 (No. 1), 152 (1963).

NOTE: Ph=Phenyl; PrN=Propionitrile; ADN=Adiponitrile; ACN=Acrylonitrile; Bu=n-Butyl.

EXAMPLE 26

100 grs. [P(ethylcyano)$_3$]$_2$ Ni (CO)$_2$ were reacted with 250 grs. 3-chloropropionitrile in a stainless steel pressure vessel fitted with stirring, condenser and a pressure regulator at 150° C. for 3.5 hours. The pressure in the reaction vessel during this time was 30 p.s.i.g. Besides unreacted 3-chloropropionitrile some acrylonitrile and propionitrile, 14.0 grs. of adiponitrile were recovered from the reaction mixture by fractional distillation under reduced pressure. The distillation residue and 1.0 liters of water were charged to a high pressure reaction vessel and reacted with H$_2$ at 1000 p.s.i.g. at 200° C. for 4 hours. As the reduction product 8.5 grs. metallic nickel was obtained. The metallic nickel so obtained was reacted with carbon monoxide at 100° C. under a carbon monoxide pressure of 500 p.s.i.g. to give 13.0 ml. Ni(CO)$_4$ which was purified by distillation. By reacting the Ni(CO)$_4$ so formed with 40.0 grs. P (ethylcyano)$_3$ in 500 ml. refluxing ethanol 51.0 grs. of the reusable reducing agent, [P(ethylcyano)$_3$]$_2$, Ni(CO)$_2$ was formed, purified and recycled back to the reaction.

EXAMPLE 27

97.8 grs. 3-bromopropionitrile, 24.0 grs. acylonitrile and 3.9 ml. (30 mmoles) Ni(CO)$_4$ are charged to a 200 ml. stainless steep pressure vessel which has been evacuated to less than 1 mm. Hg and filled wih argon to atmospheric pressure.

The reaction mixture is heated at 90° C. for 4 hours with agitation. During this time evolution of 2.5 liters (25° C.), of CO gas is measured. The temperature is then raised to 150° C. for an additional 10 hours.

After cooling down the reaction vessel to room temperature, a small sample of the reaction mixture is hydrolyzed with water and analyzed by gas chromatography. The reaction products are 2.4 grs. adiponitrile and a small amount of propionitrile besides unreacted 3-bromopropionitrile and acylonitrile.

The adiponitrile is separated from the reaction mixture by fractional distillation leaving the reducing agent mainly in its oxidized form as residue.

EXAMPLE 28

Preparation of adiponitrile 10.0 grs. of Ni(3-bromopropionitrile)$_3$ and 32.6 grs. of 3-bromo-propionitrile are added to a dry 75 ml. stainless steep pressure vessel, which has been previously evacuated to less than 1 mm. Hg and filled with argon to atmospheric pressure. The reaction vessel is then heated at 150° C. for 18 hours with agitation. The reaction mixture is cooled to room temperature, washed with 25 ml. water and then analyzed by LVP gas chromatography.

Reaction products: 1.3 grs. adiponitrile, 0.4 grs. propionitrile. Using the Ni(3-bromopropionitrile)$_3$ from Example 3 gives similar results.

EXAMPLE 29

For this example the experimental procedure of Example 28 is used.

Charge: 10.0 grs. Ni(3-bromopropionitrile)$_3$, 32.6 grs. 3-bromopropionitrile plus 80 grs. acrylonitrile.

Reaction product obtained: 1.9 grs. adiponitrile, 0.2 grs. propionitrile.

EXAMPLE 30

For this example the experimental procedure of Example 28 is used.

Charge: 16.5 g. bis-acrylonitrile nickel, 35.0 g. 3-chloropropionitrile.

Reaction conditions: 6 hours at 80° C. then 18 hours at 150° C.

As reaction product, adiponitrile is detected qualitatively by LVP. gas chromatography.

Similarly, when 3-bromopropionamide, is used in place of 3-chloropropionitrile in the above example, there is obtained 1,6-hexanediamide.

EXAMPLE 31

Using the experimental procedure of Example 30, 3-bromopropanal is dimerized to 1,6-hexandial (detected by LVP gas chromatography) by using Ni(acrolein)$_2$ as the reducing agent.

What I claim is:

1. The process for the preparation of adiponitrile which comprises coupling 3-bromopropionitrile, 3-chloropropionitrile, 3-iodopropionitrile or mixtures by reaction at 50 to 250° C. in the liquid phase with metallic iron or metallic nickel coupling agent.

2. The method of claim 1 wherein 3-bromopropionitrile is coupled.

3. The method of claim 1 wherein 3-chloropropionitrile is coupled.

4. The method of claim 1 wherein metallic iron is the coupling agent.

5. The method of claim 1 wherein metallic nickel is the coupling agent.

References Cited

UNITED STATES PATENTS

| | | | |
|---|---|---|---|
| 2,231,838 | 2/1941 | Lichty | 260—465.7 |
| 2,524,011 | 9/1950 | Erickson | 260—465.7 |
| 2,524,833 | 10/1950 | Prichard et al. | 260—465.8 |
| 2,606,204 | 8/1952 | Hogsed et al. | 260—465.8 |
| 2,644,835 | 7/1953 | Ladd et al. | 260—465.7 |
| 2,956,075 | 10/1960 | Boffa et al. | 260—465.8 |

JOSEPH P. BRUST, Primary Examiner

U.S. Cl. X.R.

260—485, 537, 561, 593, 601